United States Patent [19]

Shiba et al.

[11] Patent Number: 5,526,341
[45] Date of Patent: Jun. 11, 1996

[54] TEST DISK HAVING DEFECT PATTERNS UNIFORMLY DISTRIBUTED IN RECORDING AREAS

[75] Inventors: Mitsuo Shiba, Tokorozawa; Yoshio Yahagi, Hidaka, both of Japan

[73] Assignee: TEAC Corporation, Japan

[21] Appl. No.: 280,282

[22] Filed: Jul. 26, 1994

[30] Foreign Application Priority Data

Jul. 30, 1993 [JP] Japan ................................. 5-042207 U
Jul. 30, 1993 [JP] Japan ..................................... 5-190611

[51] Int. Cl.⁶ ..................................................... G11B 7/00
[52] U.S. Cl. ...................................... 369/275.1; 369/275.3
[58] Field of Search ............................... 369/275.1, 275.2, 369/275.3, 280, 283, 54, 58, 275.4; 430/945; 356/243

[56] References Cited

FOREIGN PATENT DOCUMENTS 3-8139   1/1991   Japan .
3-16025  1/1991   Japan .

Primary Examiner—Georgia Y. Epps
Assistant Examiner—P. W. Huber
Attorney, Agent, or Firm—Andrus, Sceales, Starke & Sawall

[57] ABSTRACT

A test disk having defect patterns uniformly arranged in recording areas is produced by a production method including: producing a stamper having a plurality of data pits in accordance with test data signals recorded on the test disk; radiating laser light to the stamper by using a laser system so that a plurality of small patterns are produced at laser-light exposed portions along first lines on the stamper, to form interruptions, which interrupt the data pits on the stamper, in accordance with the small patterns; and performing injection molding with plastic material to produce a disk based on the stamper, so that the disk has interruptions corresponding to the interruptions of the stamper, and the interruptions of the disk are included in a recording layer of the disk.

4 Claims, 8 Drawing Sheets

5,526,341

TEST DISK HAVING DEFECT PATTERNS UNIFORMLY DISTRIBUTED IN RECORDING AREAS

BACKGROUND OF THE INVENTION (1) Field of the Invention

The present invention relates to a test disk used to test a playing ability of a disk player by reproducing signals from defect patterns of recording areas of the test disk, and to a method of production of the test disk.

(2) Description of the Prior Art

A disk storage medium such as a compact disk that is housed in a compact disk player might have in the recording areas several physical defects: black dots, dust, fingerprints, stains, lack of data pits, flaws, etc. In particular, the black dots may appear with foreign matter included in the recording areas of the disk storage medium during the disk production, and dust, fingerprints and stains may stick to the disk surface.

Compact disk players are primarily designed to reproduce music signals from a compact disk, and it is necessary to test the playing ability of compact disk players before the release from the assembly plant. A test disk is used to test the playing ability of the compact disk players during inspection processes after the assembly is completed. That is, the test disk is placed into the compact disk player during the inspection processes, and the playing ability of an assembled compact disk player is tested by reproducing signals from the recording areas of the test disk during inspection processes. The playing ability is evaluated based on the reproduced signals from the test disk.

A primary object of the test disk is to simulate the defects which might be included in the recording areas of the disk storage medium, when signals are reproduced from the recording areas of the test disk. To attain this object, the recording areas of test disks are formed with defect patterns which include: 1) interruptions that are defect patterns used to simulate the lack of data pits and the flaws mentioned above; 2) black bands that are defect patterns used to simulate the black dots, the dust and the stains mentioned above; and 3) fingerprint patterns that are defect patterns used to simulate the fingerprint mentioned above.

The recording areas of a test disk may be composed of music signal tracks in which music signals are recorded, and sine-wave signal tracks in which sine-wave signals are recorded. As described above, the playing ability of compact disk players is tested based on the reproduced signals from the test disk. For example, an inspecting person may evaluate the playing ability of a compact disk player which has been assembled in the assembly plant, by hearing music sound obtained from the music signals reproduced from the music signal tracks of the test disk wherein defect patterns are included. This testing is performed by the hearing ability of the inspecting person. Also, the playing ability of the compact disk player may be evaluated by electrically measuring a frequency obtained from the sine-wave signals reproduced from the sine-wave signal tracks of the test disk wherein defect patterns are included, by use of a waveform measuring instrument such as an oscilloscope.

Therefore, the test disk is used to test the playing ability of the disk player by reproducing signals from the recording areas of the test disk containing the defect patterns. Hereinafter, the defect patterns from which the signals are reproduced for testing the playing ability of the disk player are the interruptions mentioned above, unless otherwise specified.

In order to make the testing of the playing ability of the disk player reliable and accurate, it is desirable that the playing ability of the disk player is tested with a test disk having defect patterns which are arranged at random in the recording areas of the test disk. Therefore, it is necessary to produce a test disk having such defect patterns arranged at random, for use in the testing of the playing ability of the disk player.

In conventional methods of production of test disks, the test disks are produced from plastics such as polycarbonate through injection molding by use of a stamper. The stamper is a base on which the test disk is produced through injection molding. However, in the conventional methods, defect patterns are formed on the stamper by manually scratching the corresponding portions of the stamper by hand, or by machining the corresponding portions of the stamper by use of machining equipment.

To produce a test disk by use of a stamper with the manually scratched portion, a relatively large amount of labor and time is necessary and the cost of the production of the test disk will be raised. The efficiency of the inspection by the inspecting operator will become lower. In addition, when the defect patterns are manually scratched on the stamper, it is likely that the defect patterns are arranged in the recording areas of the test disk with a deviation, that is, the test disk may have some portions with defect patterns being densely arranged and the other portions with defect patterns being sparsely arranged. Therefore, the testing of the playing ability of disk players performed with such a test disk may become inaccurate due to the deviation of the defect patterns within the test disk.

On the other hand, when a test disk is produced by machining the stamper by use of the machining equipment, it is impossible to realize the test disk having defect patterns arranged at random in the recording areas of the test disk. The defect patterns within such a test disk are arranged in one direction only, and they are spaced from one another at fixed intervals. It is difficult to simulate the defects which might be included in an actual compact disk, by reproducing signals from the test disk.

SUMMARY OF THE INVENTION

Accordingly, it is a general object of the present invention to provide an improved test disk in which the above described problem is eliminated.

Another, more specific object of the present invention is to provide a test disk which has defect patterns uniformly distributed in recording areas of the test disk so as to allow the testing of the playing ability of the disk player using the test disk to be accurate and reliable.

Still another object of the present invention is to provide a method of production of a test disk which effectively produces a test disk having defect patterns uniformly distributed in recording areas of the test disk.

The above mentioned object of the present invention is achieved by a test disk having defect patterns in recording areas which includes: a plurality of recording areas in which test data signals are recorded in a form of data pits; and a plurality of radially extending defect patterns which are uniformly arranged in the recording areas and interrupt the data pits in the recording areas, said defect patterns comprising a set of lines of small patterns, the small patterns extending along each line in a first direction of the test disk, the lines of the small patterns being overlapping each other with respect to a direction perpendicular to the first direction of the test disk, and the small patterns being shifted relative to one another along the lines.

The above mentioned object of the present invention is achieved by a method of production of a test disk having defect patterns in recording areas which includes steps of: producing a stamper having a plurality of data pits in accordance with test data signals; radiating laser light to the stamper by using a laser system so that a plurality of small patterns are produced at laser-light exposed portions along a plurality of first lines on the stamper, to form interruptions which interrupt the data pits on the stamper in accordance with the small patterns; performing injection molding with plastic material to produce a disk based on the stamper, so that the disk has interruptions corresponding to the interruptions of the stamper, the interruptions of the disk being included in a recording layer of the disk; covering the disk with metal through surface layer deposition, so that a reflection film of the metal is formed on the recording layer of the disk; and covering the reflection film and the recording layer with a protective film of synthetic resin, thereby producing the test disk.

The test disk according to the present invention has defect patterns uniformly distributed in the recording areas without deviation. Therefore, by use of the test disk according to the present invention when testing the playing ability of the disk player, the defects which might be included in a compact disk housed in a compact disk player can be accurately simulated. Thus, it is possible to make the testing of the playing ability of the disk player more accurate and more reliable than when a conventional test disk is used. The accuracy of the test can be remarkably increased according to the present invention. In addition, it is possible to easily prevent the test disk from having the defect patterns arranged in the recording areas with a deviation. The efficiency of production Of test disks can be remarkably increased by performing the method of production of the test disk according to the present invention.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
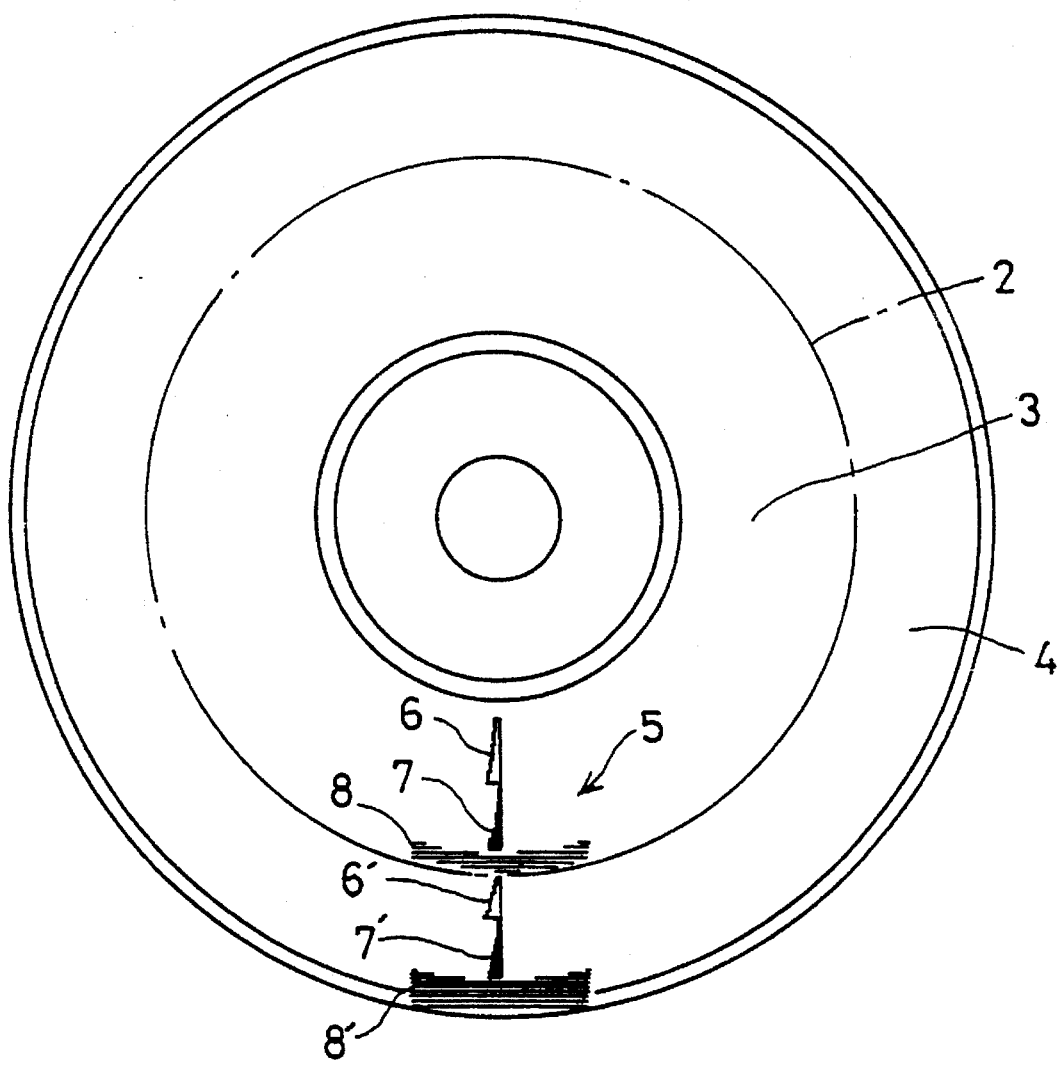
FIG. 1 is a plan view of a preferred embodiment of a test disk according to the present invention.
Figure 2:
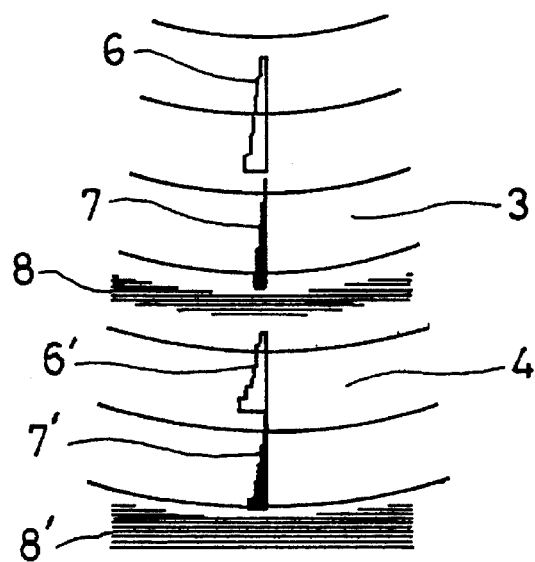
FIG. 2 is an enlarged view showing defect patterns of recording areas of the test disk in FIG. 1.
Figure 3:
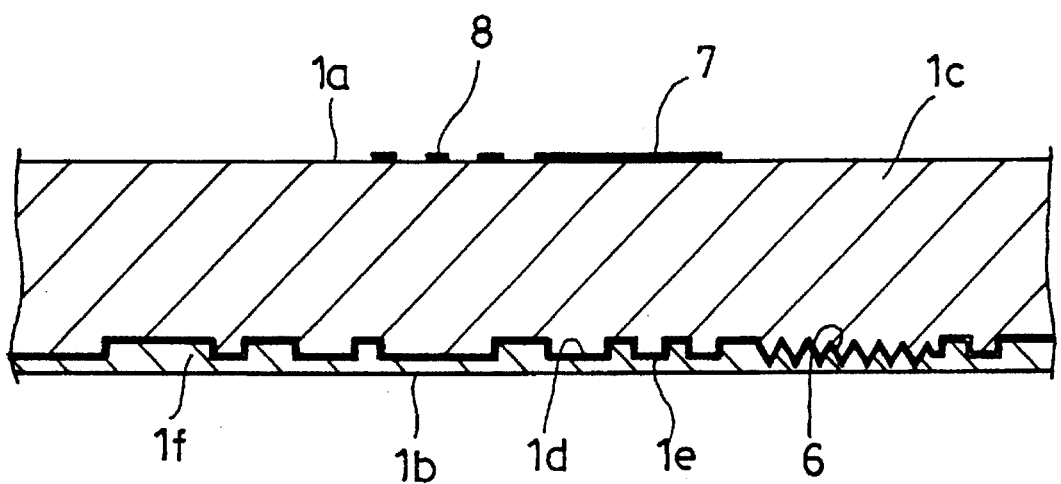
FIG. 3 is a sectional view showing the structure of the test disk in FIG. 1.

A description will now be given of an embodiment of a test disk according to the present invention with reference to FIGS. 1 through 3. FIG. 1 shows the embodiment of the test disk according to the present invention. FIG. 2 shows defect patterns in recording areas of the test disk in FIG. 1. FIG. 3 shows the structure of the test disk in FIG. 1.

When the playing ability of the compact disk player is tested, the test disk 1 in FIG. 1 is used. That is, the test disk 1 is inserted into a disk player at the reproducing position, and the playing ability of the disk player is tested by reproducing signals-from the test disk 1. Therefore, the size of the test disk is the same as the size of a compact disk which is housed in a compact disk player.

In FIG. 1, the test disk 1 has recording areas which include a first area 3 and a second area 4, and the first and second areas are separated from each other by a boundary 2. The boundary 2 is a circular line in the middle of the recording areas of the test disk 1. The first area 3 is located near the center of the test disk 1 and includes a plurality of music signal tracks. The second area 4 is located near the outer periphery of the test disk 1 and includes a plurality of sine-wave signal tracks.

As shown in FIG. 3, the test disk 1 has a read-out surface 1a on the top and a print surface 1b on the bottom. Information is read out from the test disk 1 by placing a head of a compact disk player on the read-out surface 1a. A title of the test disk 1, for example, is printed on the print surface 1b.

In FIG. 3, the test disk 1 is composed of a disk 1c of polycarbonate, a recording layer 1e on the bottom of the disk 1c, a reflection film 1d on the bottom of the recording layer 1e, and a protective film 1f on the bottom of the reflection film 1d. The reflection film 1d is made of aluminum, and it is formed through surface layer deposition. The protective film 1f is made of plastics. The recording layer 1e is composed of data pits formed on the background of the reflection film 1d.

In the test disk 1 in FIG. 1, the first area 3 includes a plurality of music signal tracks with track numbers 1 through 13, each track containing a piece of music being recorded (that is, test music signals), the reproducing time of each piece of music amounting to 1.5 minutes. The second area 4 includes a plurality of sine-wave signal tracks with track numbers 14 through 43, the sine-wave signal tracks having even track numbers (14, 16, . . . , 42) with 1 kHz frequency signals being recorded, the reproducing time of one-track frequency signals amounting to 30 seconds, and the sine-wave signal tracks having odd track numbers (15, 17, . . . , 43) with 10 kHz frequency signals being recorded, the reproducing time of one-track frequency signals amounting to 30 seconds. That is, the 30-second 1 kHz frequency signals and the 30-second 10 kHz frequency signals alternately appear track by track within the second area 4 of the test disk 1. The track number indicates a specific location of the test disk 1 in the recording areas, and it is also called the address number.

As shown in FIGS. 1 and 2, the test disk 1 further includes defect patterns 5. The defect patterns 5 are composed of interruptions 6, black bands 7 and fingerprint patterns 8 on the inner tracks within the first area 3, and interruptions 6', black bands 7' and fingerprint patterns 8' on the outer tracks within the second area 4. The defect patterns 5 extend in a radial direction of the test disk 1 through the first area 3 and the second area 4. The interruptions 6 (or 6'), the black bands 7 (or 7') and the fingerprint patterns 8 (or 8') appear from the inner tracks to the outer tracks in this order.

The interruptions 6 are defect patterns which are used to simulate the lack of data pits and the flaws, and located in the recording layer 1e within the first area 3 of the test disk 1. The interruptions 6 radially extend and intersect the music signal tracks with the track numbers 2 through 7 which are within the first area 3. The width of the interruptions 6 in the circumferential direction within one track is the same, and the widths of the interruptions 6 in the circumferential direction are increased in a stepwise manner track by track from the inside of the test disk 1 to the outside. The interruptions 6 are produced from a stamper whose data pits are exposed to a pattern of laser light repeatedly radiated to the stamper so as to flaw some of the data pits at random.

The black bands 7 are defect patterns in the first area 3 which are used to simulate the black dots which might be produced during the disk molding, and the dust and stains which might stick to the disk surface. The black bands 7 radially extend and intersect the music signal tracks with the track numbers 8 through 12 which are within the first area 3. Similarly to the interruptions 6, the width of the black bands 7 in the circumferential direction within one track is the same, and the widths of the black bands 7 in the circumferential direction are increased in a stepwise manner track by track from the inside of the test disk 1 to the outside. The black bands 7 are formed with a black coating film printed on the read-out surface 1a of the test disk 1.

The fingerprint patterns 8 are defect patterns in the first area 3 which are used to simulate the fingerprint which might stick to the disk surface. The fingerprint patterns 8 circumferentially extend and intersect the music signal track with the track number 13. The width of the fingerprint patterns 8 in the circumferential direction within this track is the same. Similarly to the black bands 7, the fingerprint patterns 8 are formed with a black coating film printed on the readout surface 1a of the test disk 1.

The interruptions 6' within the second area 4 have the same function as the interruption 6 described above, and located in the recording layer 1e within the second area 4 of the test disk 1. The interruptions 6' extend radially and intersect the sine-wave signal tracks with the track numbers 16 through 29 which are within the second area 4. The width of the interruptions 6' in the circumferential direction within two adjacent tracks, that is, an even-track-number track and a following odd-track-number track, is the same, and the widths of the interruptions 6' in the circumferential direction are increased in a stepwise manner from the inside of the test disk 1 to the outside.

The black bands 7' within the second area 4 has the same function as the black bands 7 described above. The black bands 7' radially extend and intersect the sine-wave signal tracks with the track numbers 30 through 41 which are within the second area 4. Similarly to the interruptions 6', the width of the black bands 7' in the circumferential direction within two adjacent tracks is the same, and the widths of the black bands 7' in the circumferential direction are increased in a stepwise manner from the inside of the test disk 1 to the outside.

The fingerprint patterns 8' within the second area 4 has the same function as the fingerprint patterns 8 described above. The fingerprint patterns 8' circumferentially extend and intersect the sine-wave signal tracks with the track numbers 42 and 43. The width of the fingerprint patterns 8' in the circumferential direction within these tracks is the same.

In a compact disk player assembly plant, the playing ability of an assembled compact disk player is tested in inspection processes by inserting the test disk 1 described above into the compact disk player and reproducing signals from the test disk 1. By hearing the music according to the reproduced signals, an inspecting person checks whether a music interruption or a noise occurs due to a problem of the reproduced signals.

When a hearing test of the playing ability of the assembled compact disk player is conducted, the inspecting person selects one of the track numbers 2 through 13 of the music signal tracks which are within the first area 3, and then hears the music according to the signals reproduced from the selected track to test the playing ability of the compact disk. The playing ability includes, for example, the sensitivity of a noise reduction circuit, and the accuracy of track selection. When a problem is detected by the testing of the playing ability, an adjustment of the compact disk player is performed.

When an electrical test of the playing ability of the assembled compact disk player is conducted using a waveform measuring instrument, the inspecting person selects one of the track numbers 16 through 43 of the sine-wave signal tracks which are within the second area 4, and then checks a change in the waveform of the signal reproduced from the selected track using the waveform measuring instrument.

The test disk 1 according to the present invention has in the recording areas the first area 3 of the music signal tracks and the second area 4 of the sine-wave signal tracks, which are separated from each other. Therefore, either the hearing test or the electrical test can be easily performed by selecting one of the track numbers.

The test disk 1 according to the present invention has the interruptions 6, the black bands 7 and the fingerprint patterns 8 within the first area 3, and the interruptions 6', the back bands 7' and the fingerprint patterns 8' within the second area 4. Therefore, the hearing test relating to the first area 3 and the electrical test relating to the second area 4 can be performed independently of each other. It is possible to eliminate a problem with a conventional test disk with which the inspecting person hears abnormal sound due to the reproduction of sine-wave signals when the hearing test is performed with a music signal track. The conventional test disk includes sine-wave signal tracks and music signal tracks which alternately appear in the recording areas.

Figure 4:
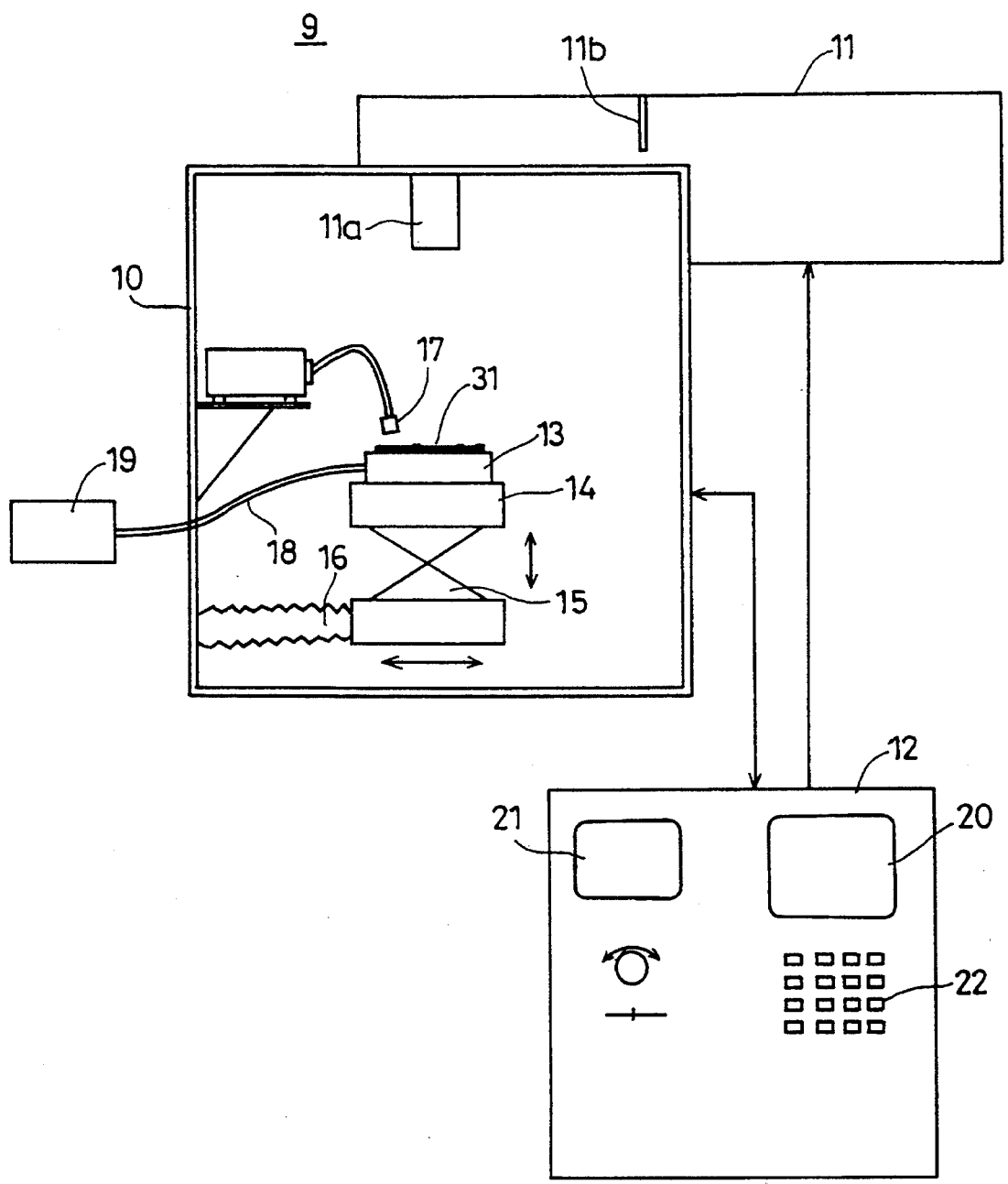
FIG. 4 is a diagram showing a laser system which radiates laser light to a stamper to form defect patterns on the stamper.

FIG. 4 shows a laser system 9 which is used to form defect patterns on a stamper by radiating laser light to the stamper, the defect patterns corresponding to the interruptions 6 and 6' on the test disk 1. As described above, the stamper is the base on which the test disk 1 is produced through injection molding.

In FIG. 4, the laser system 9 is made up of a workpiece chamber 10, a laser unit 11, and a control panel 12. Within the workpiece chamber 10, a workpiece (that is, the stamper in this embodiment) is held or clamped by an air-actuated clamper 13, and the clamper 13 is supported on an XY table 14. Furthermore, within the workpiece chamber 10, there are provided an elevating mechanism 15 which raises or lowers the XY table 14 in vertical directions, a sliding mechanism 16 which moves the XY table 14 in horizontal directions in association with the vertical movement of the XY table 14 by the elevating mechanism 15, and a CCD (charge coupled device) camera 17 which is used to check a reference position of the workpiece on the XY table 14.

The clamper 13 is connected to an external vacuum unit 19 via a tube 18. Before laser light is radiated to the workpiece, the inside of the clamper 13 is subjected to a negative pressure by the vacuum unit 19 and the workpiece is fixed onto the clamper 13 by suction force.

The laser unit 11 is attached to the top of the workpiece chamber 10. The laser unit 11 is made up of a laser light source (not shown) and other optical components (not shown) including lenses, mirrors and prisms. The laser unit 11 includes a laser emission outlet 11a projecting into the workpiece chamber 10 and a removable slit plate 11b within the laser unit 11. Laser light emitted by the laser unit 11 is radiated from the laser emission outlet 11a to the workpiece held by the clamper 13. The slit plate 11b has a slit which converts the laser light from the laser unit 11 into a pattern of laser radiation applied to the workpiece. It is possible to vary the pattern of laser radiation applied to the workpiece by changing the size and shape of the slit of the slit plate 11b.

The control panel 12 includes a workpiece monitoring display 20, a command display 21, and a set of operation keys 22. The workpiece monitoring display 20 is a monitoring window in which an image obtained from the workpiece on the XY table 14 by the CCD camera 17 is displayed. The command display 21 is a display device in which an instruction of a program is displayed. An inspecting person may adjust the position of the workpiece on the XY table 14 by moving the elevating mechanism 15 and the sliding mechanism 16 through the control panel 12. After the workpiece is set to the reference position on the XY table 14 by viewing the image produced from the CCD camera 17, the inspecting person may control the radiation of laser light emitted from the laser unit 11 to the workpiece while the XY table 14 is being moved, by making use of the control panel 12.

Figure 5:
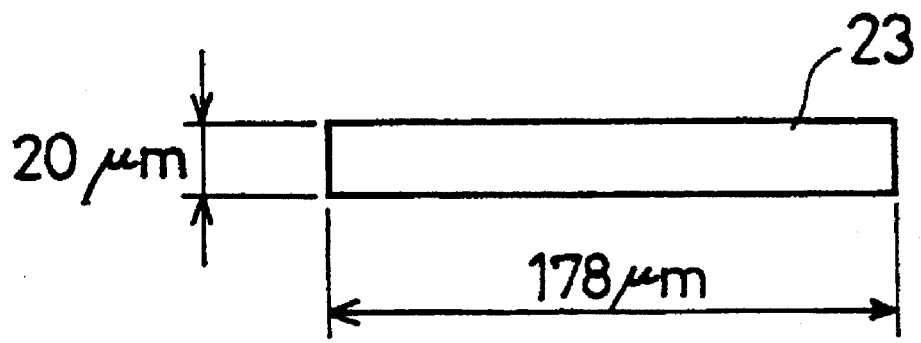
FIG. 5 is an enlarged view showing a pattern of laser light radiation from the laser system in FIG. 4.
Figure 6:
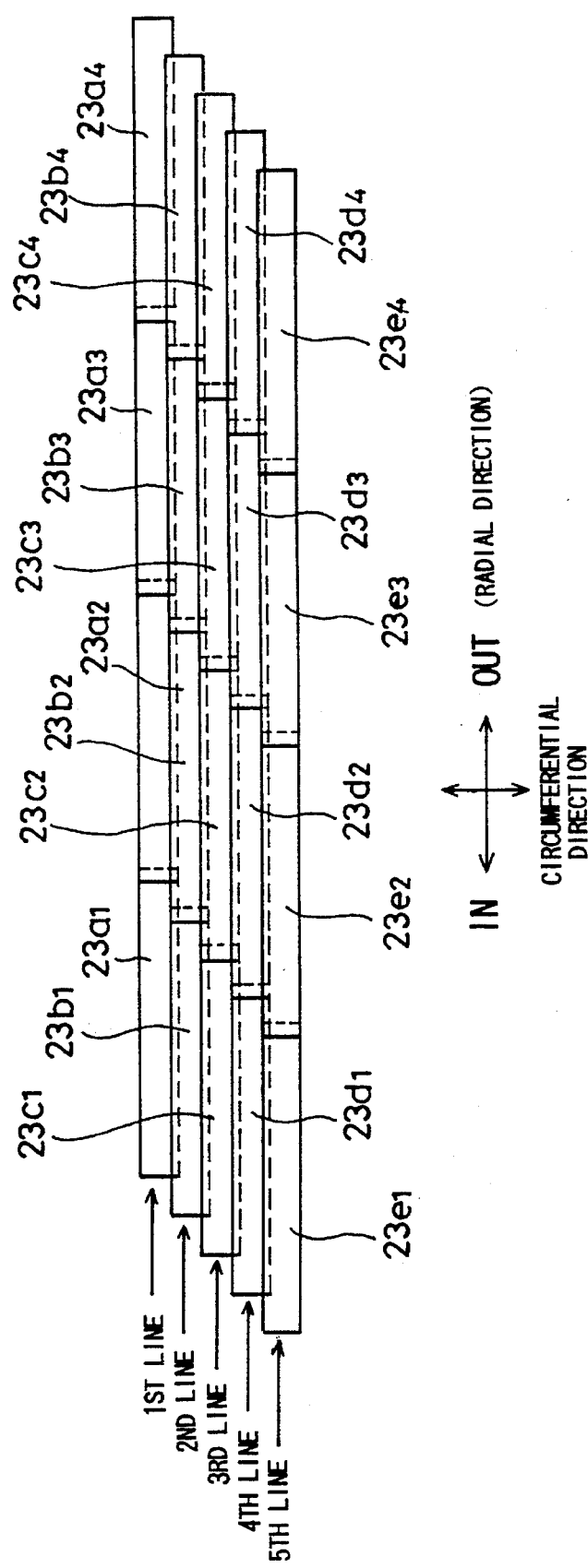
FIG. 6 is an enlarged view showing defect patterns formed on the stamper by use of the laser system in FIG. 4.

FIG. 5 shows a pattern 23 of laser light radiation from the laser system 9, and FIG. 6 shows defect patterns formed on a stamper by use of the laser system in FIG. 4.

The pattern 23 of laser light radiated from the laser system 9 varies depending on the shape and size of the slit of the slit plate 11b. In this embodiment, the pattern 23 of the laser light from the laser system 9 has a rectangular shape. For example, the shorter sides of this rectangle are 20 μm long and the longer sides thereof are 178 μm long. A portion of the stamper, which has been exposed to the pattern of the laser light from the laser system 9, constitutes one of a plurality of recesses as the defect patterns formed on the stamper. The interruptions of the defect patterns on the test disk 1, which are produced through injection molding by use of the stamper, correspond to a plurality of such recesses on the stamper exposed to the pattern of the laser light.

A description will be given of the way the interruptions 6 and 6' of the defect patterns are formed on the stamper by using the laser system 9, with reference to FIG. 6. In FIG. 6, the pattern 23 of the laser light from the laser system 9 is radiated to the stamper so that a plurality of small patterns of laser-light exposed portions 23a1 through 23an (where n is an integer) are arranged along a first line. This first line extends in a radial direction of the stamper (which direction is parallel to the longitudinal direction of the pattern 23 and corresponds to a radial direction of the test disk 1). The pattern 23 of laser light from the laser system 9 is repeatedly shifted from an inner portion of the stamper to an outer portion thereof along the first line, such that two adjacent portions among the laser-light exposed portions 23a1 through 23an overlap each other. The shifting of the laser light pattern with respect to the stamper described above is realized by moving the XY table 14, on which the stamper is supported, with respect to the laser emission outlet 11a of the laser unit 11 by means of the sliding mechanism 16 and/or the elevating mechanism 15. This shifting is automatically carried out by the laser system 9 in accordance with a program stored within the laser system 9.

After the radiation of laser light to the laser-light exposed portions 23a1 through 23an on the first line is completed, the pattern 23 of laser light from the laser system 9 is slightly shifted in a circumferential direction of the stamper (which direction is perpendicular to the longitudinal direction of the pattern 23 and corresponds to a track running direction of the test disk 1), and it is slightly shifted in the inward, radial direction of the stamper. Then, the pattern 23 of laser light from the laser system 9 is radiated to the stamper so that a plurality of small patterns of laser-light exposed portions 23b1 through 23bn are arranged along a second line. The laser-light exposed portions 23a1 through 23an on the first line and the laser-light exposed portions 23b1 through 23bn on the second line overlap each other. The pattern 23 of laser light from the laser system 9 is slightly shifted along the first line in a direction opposite to the above circumferential direction. Two adjacent portions among the laser-light exposed portions 23a1 through 23an overlap each other.

In the same manner as described above, by radiating the pattern 23 of laser light from the laser system 9 to the stamper, subsequent small patterns of laser-light exposed portions are formed on subsequent lines on the stamper as shown in FIG. 6.

The laser-light exposed portions described above are subjected to thermal deformation, and defect patterns are formed on the stamper at corresponding locations. Since the laser light pattern from the laser system 9 is twice radiated to the stamper for the overlaps of the laser-light exposed portions described above, the resulting defect patterns become different from defect patterns for the non-overlapping portions of the laser-light exposed portions. Consequently, the defect patterns which are produced through the radiation of laser light by use of the laser system 9 have irregular shape and dimensions and are arranged on the stamper surface at random.

Figure 7:
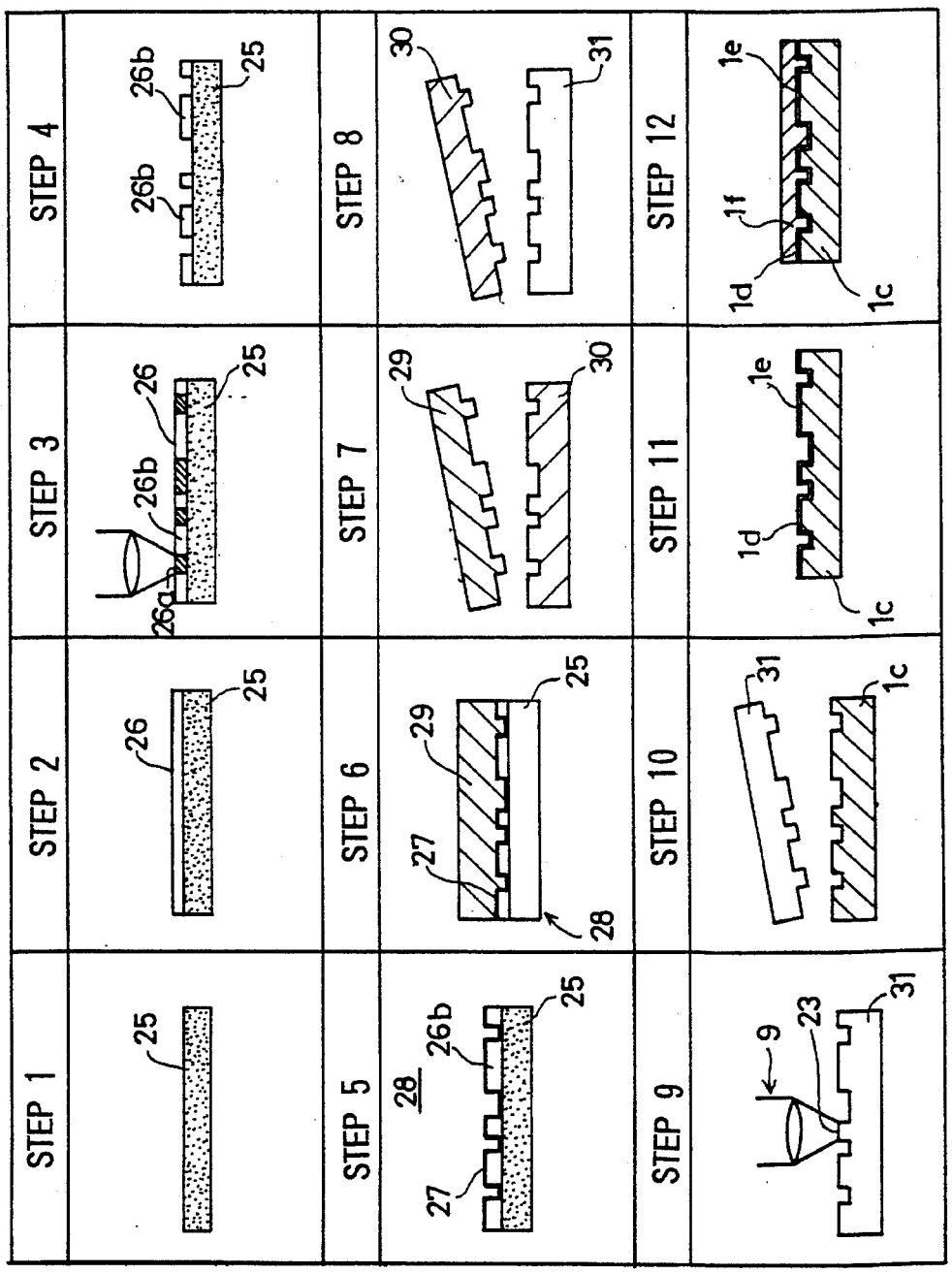
FIG. 7 is a diagram for explaining a method of production of a test disk according to the present invention.

Next, a description will be given, with reference to FIG. 7, of a method of production of the test disk 1 according to the present invention. FIG. 7 shows the method of production of the test disk 1 according to the present invention.

In FIG. 7, step 1 prepares a glass plate 25 with a well-polished, flat surface.

Step 2 attaches a photoresist 26 to the polished surface of the glass plate 25.

Step 3 records music data onto the photoresist 26 by radiating laser light to the photoresist 26. A set of data pits (or irregular small recesses) corresponding to the music data is formed at laser-light non-exposed portions 26b of the photoresist 26.

Step 4 performs a developing process for the photoresist 26 in step 3 so that the laser-light exposed portions 26a of the photoresist 26 are removed and the laser-light non-exposed portions 26b become the data pits corresponding to the music data.

Step 5 produces a disk master 28 by plating the photoresist portions 26b on the glass plate 25 with copper or silver. The disk master 28 has a copper-plated surface 27 on the glass plate 25 and the photoresist portions 26b.

Step 6 produces a metal master 29 based on the disk master 28 in step 5.

Step 7 produces a mother disk 30 based on the metal master 29 in step 6.

Step 8 produces a stamper 31 based on the mother disk 30 in step 7.

Step 9 radiates laser light to the stamper 31 by using the laser system 9 in FIG. 4, so that a plurality of small patterns (corresponding to the interruptions 6 and 6' of the test disk 1 described above) are formed at laser-light exposed portions along a plurality of lines on the stamper 31.

Step 10 performs injection molding with polycarbonate to produce a test disk based on the stamper 31, so that the interruptions 6 and 6' are formed in the recording layer 1e of the disk 1c in accordance with the small patterns of the stamper 31 in step 9.

Step 11 covers the disk 1c with aluminum through surface layer deposition, so that the reflection film 1d of aluminum is formed on the recording layer 1e which is the bottom of the disk 1c.

Step 12 covers the reflection film 1d and the recording layer 1e of the disk 1c with a protective film 1f. The protective film 1f is made of synthetic resin.

After the above steps 1 through 12 in FIG. 7 are carried out, the test disk 1 according to the present invention is produced. As in the step 9 above, the laser light pattern from the laser system 9 is radiated to the stamper 31, so that the stamper 31 includes portions which are used to form the interruptions 6 in the first area 3 and the interruptions in the second area 4 on the test disk 1. Therefore, the test disk 1 according to the present invention has the interruptions 6 and 6' which are the defect patterns distributed over the recording layer 1e of the test disk 1.

Figure 8A:
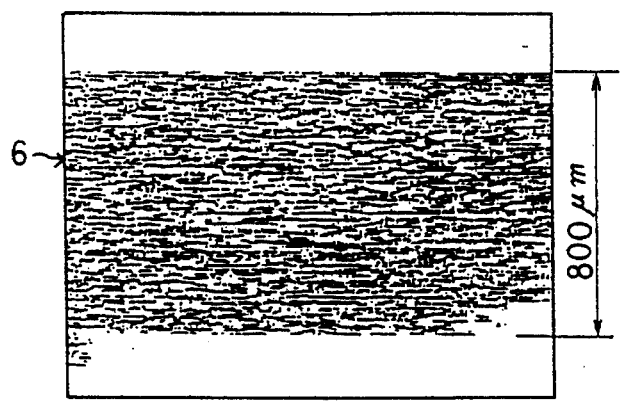
FIGS. 8A through 8C are enlarged sectional views showing interruptions in a first area of the test disk containing music signal tracks.
Figure 8B:
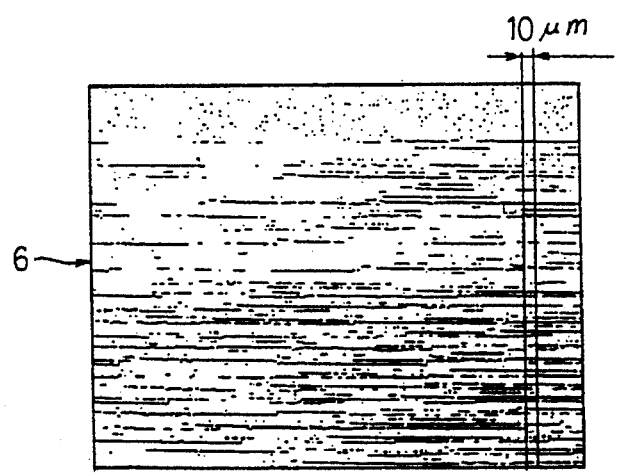
Figure 8C:
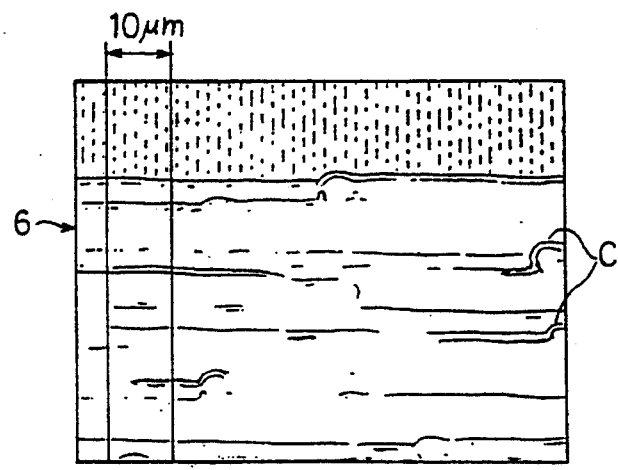

FIGS. 8A through 8C show the interruptions 6 formed in the first area 3 of the test disk 1 containing music signal tracks. FIG. 8B is an enlarged view of the interruptions 6 in FIG. 8A, and FIG. 8C is a further enlarged view of the interruptions 6 in FIG. 8B.

Figure 9A:
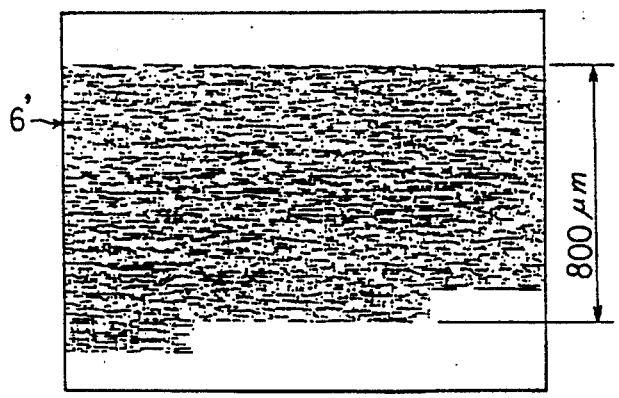
FIGS. 9A through 9C are enlarged sectional views showing interruptions in a second area of the test disk containing sine-wave signal tracks.
Figure 9B:
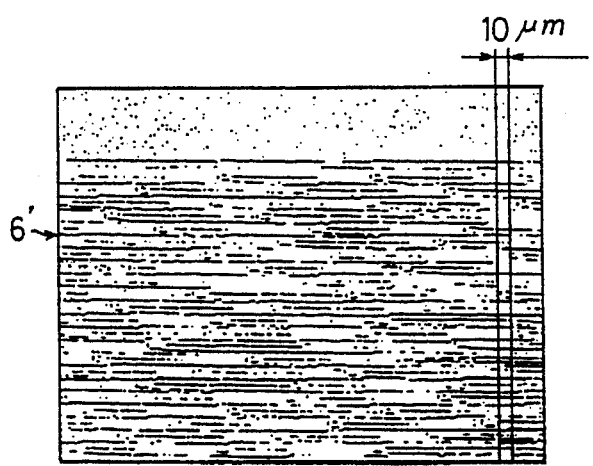
Figure 9C:
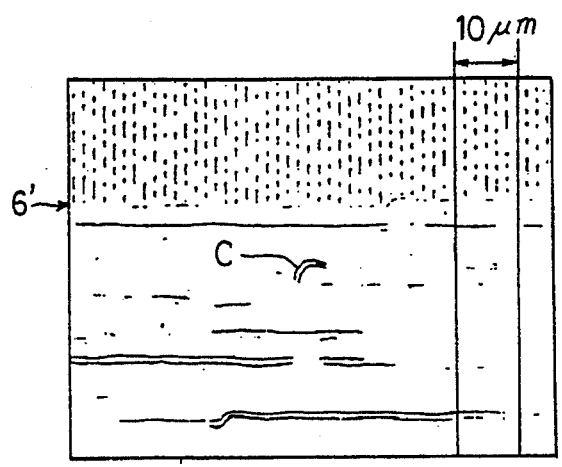

FIGS. 9A through 9C show the interruptions 6' in the second area 4 of the test disk 1 containing sine-wave signal tracks. FIG. 9B is an enlarged view of the interruptions 6' in FIG. 9A, and FIG. 9C is a further enlarged view of the interruptions 6' in FIG. 9B.

As shown in FIGS. 8A and 9A, the interruptions 6 and 6' on the test disk 1 according to the present invention are defect patterns distributed over the recording layer 1e of the entire test disk. It can be seen from FIGS. 8C and 9C that the interruptions 6 and 6' (or the defect patterns indicated by "C" in FIGS. 8C and 9C) are arranged in the recording areas at random and spaced from one another without deviation. The test disk 1 according to the present invention has the interruptions uniformly distributed over the recording areas of the test disk 1 without deviation, so as to simulate the physical flaws which might appear on the actual compact disk.

Accordingly, the test disk according to the present invention has defect patterns uniformly distributed in the recording areas without deviation. Therefore, by use of the test disk according to the present invention when testing the playing ability of the disk player, the defects which might be included in a compact disk housed in a compact disk player can be accurately simulated. Thus, it is possible to make the testing of the playing ability of the disk player more accurate and more reliable than when a conventional test disk is used. The accuracy of the test can be remarkably increased according to the present invention. In addition, by use of the laser system, it is possible to easily prevent the test disk having the defect patterns arranged in the recording areas with a deviation from being produced. The efficiency of production of test disks can be remarkably increased by performing the method of production of the test disk according to the present invention.

Further, the present invention is not limited to the above described embodiments, and variations and modifications may be made without departing from the scope of the present invention.

What is claimed is:

1. A test disk having defect patterns in recording areas, comprising:

a plurality of recording areas in which test data signals are recorded in a form of data pits; and a plurality of defect patterns which are uniformly arranged in the recording areas and interrupt the data pits in the recording areas, said defect patterns comprising a set of lines of small patterns, said small patterns extending along each line in a first direction of the test disk, said lines of said small patterns overlapping each other with respect to a direction perpendicular to the first direction, and said small patterns being shifted relative to one another along the lines.

2. A test disk according to claim 1, wherein said small patterns are formed in the recording areas of the test disk in accordance with laser-light exposed portions of a stamper, said laser-light exposed portions on said stamper being shifted relative to one another in a direction corresponding to the radial direction of the test disk.

3. A test disk according to claim 1, wherein said recording areas comprises a first area having a plurality of music signal tracks in which music signals are recorded and a second area having a plurality of frequency signal tracks in which frequency signals are recorded, and said defect patterns being individually arranged in said first area and in said second area.

4. A test disk according to claim 3, wherein said radially extending defect patterns individually intersect said music signal tracks and said frequency signal tracks, a width of said defect patterns within one track in a circumferential direction is the same, and widths of said defect patterns in the circumferential direction are increased track by track in a stepwise manner.

* * * * *